United States Patent [19]
Bara

[11] 3,894,699
[45] July 15, 1975

[54] CARTRIDGE TAPE PLAYER SYSTEM HAVING REVERSE AND FAST-FORWARD MODES OF OPERATION

[75] Inventor: Edwin S. Bara, Chicago, Ill.

[73] Assignee: Motorola, Inc., Chicago, Ill.

[22] Filed: July 16, 1973

[21] Appl. No.: 379,293

[52] U.S. Cl. ............................ 242/55.19 A; 360/93
[51] Int. Cl.[2] .............. G11B 15/20; G11B 15/44; B65H 17/48
[58] Field of Search... 242/55.19 R, 55.19 A, 55.21; 179/100.22; 274/4 B; 352/128; 360/93

[56] References Cited

UNITED STATES PATENTS

| | | | |
|---|---|---|---|
| 2,338,421 | 1/1944 | Fries | 242/55.21 X |
| 2,810,574 | 10/1957 | Daniel | 242/55.19 A |
| 3,252,670 | 5/1966 | Smith, II | 242/55.19 A |
| 3,560,126 | 2/1971 | Lear | 242/55.19 A |
| 3,677,628 | 7/1972 | Walker | 242/55.19 A |

*Primary Examiner*—Billy S. Taylor
*Attorney, Agent, or Firm*—James W. Gillman; Donald J. Lisa

[57] ABSTRACT

A cartridge tape player sytem includes a tape cartridge having the usual continuous loop tape mounted for movement through the cartridge on a rotatable hub. The hub is coupled to a central shaft extending through the outer wall of the cartridge. A circular platen is mounted for independent rotation in the cartridge beneath the hub about the central shaft. The hub and wound tape rests on the platen. The cartridge player of the system includes the usual cartridge receiving cavity, magnetic tape head and capstan drive shaft for engaging a pressure roller in a cartridge received in the cavity and driving the tape through the cartridge in a first direction; the tape being removed from the hub at the inner convolution and returned thereto at the outer convolution. A one-way clutch arrangement joins the hub and platen for rotation when the tape is moved in the last-mentioned direction. An auxiliary drive shaft mounted at the entrance of the cavity is coupled to the capstan shaft and is driven rotatably thereby. Reverse and fast-forward pushbutton controls are provided on the player. The reverse button, when depressed, raises the drive shaft for engagement with the central hub shaft of the cartridge to drive the hub in a reverse direction, opposite from that when driven by the capstan shaft. In this case, the tape is removed from the hub at the outer convolution and returned at the inner convolution. To accomplish the latter, guide fingers are provided in the cartridge which separate the inner convolution of the tape from the hub to permit the incoming tape to be "tucked" therebetween. The one-way clutch is disengaged to permit independent rotation of the hub and platen to ensure proper winding of the tape about the hub during the reverse mode of operation. A pivotal member actuated by the depression of the pushbutton moves the cartridge away from the capstan shaft and tape head to permit the raised drive shaft to engage the central hub shaft. An expansion ring in the cartridge surrounding the wound tape contracts upon movement of the cartridge away from the capstan shaft to limit the diameter of the wound tape and to ensure proper reverse winding of the tape about the hub. Depression of the fast-forward button also raises the drive shaft into driving engagement with the central hub shaft and pivots the pivotal member to move the cartridge out of engagement with the tape head and capstan drive shaft. A member coupled to the fast-forward pushbutton likewise operates a switch to reverse the direction of the drive motor driving the capstan and auxiliary drive shafts, thereby to drive the latter in the proper rotational direction. Also, a member is moved toward the cartridge to engage a pin extending from the cartridge. The last-mentioned pin is depressed thereby inwardly of the cartridge to hold the expansion ring in an expanded state away from the wound tape while in the fast-forward mode of operation. The one-way clutch is also engaged to join the platen and hub for rotation.

37 Claims, 10 Drawing Figures

CARTRIDGE TAPE PLAYER SYSTEM HAVING REVERSE AND FAST-FORWARD MODES OF OPERATION

BACKGROUND

This invention relates generally to magnetic tape players and more particularly to cartridge type tape player systems.

While cartridge type tape players have, since being introduced, been popular with the public, they have always had the drawback that the endless tape in the cartridge could be driven only in the direction. Because of this, it is impossible to return to a desired location on the tape without permitting the tape to run fully through the cartridge. This made it inconvenient for one desiring to listen to specific areas of the recorded tape and for adapting the cartridge tape player for recording purposes.

It has always been difficult to provide a reverse mode in the case of a cartridge tape player because of the construction of the tape cartridge itself. The cartridge includes a central hub about which the roll of tape is wound. The tape is endless, and as such, is fed from the center of the hub and returned to the outer periphery of the roll in normal operation. To reverse the tape then, it is necessary to feed the tape back between the innermost layer of the roller and the hub. Attempts to accomplish the latter have failed, resulting in entanglement of and possible damage to the tape itself.

SUMMARY

Accordingly, it is a primary object of the subject invention to provide a new and improved cartridge tape player system wherein a tape cartridge similar to a standard cartridge with certain modifications, can be driven in reverse and at fast-forward speeds while avoiding the drawbacks described heretofore.

It is another object of the present invention to provide a cartridge tape player system of the above described type in which conventional tape cartridges as well as those specifically modified for use in the system, can be played.

It is still another object of the present invention to provide a system of the above described type which uses the basic cartridge tape player and tape cartridges modified slightly to provide a fast-forward and reverse mode of operation, without causing undue wear or damage to the recording tape therein.

It is also an object of the present invention to provide a cartridge tape player system of the above described type which lends itself to operation as a recorder for recording information on the tape provided in a cartridge used in the system.

It is yet another object of the present invention to provide a new and improved tape cartridge in which the tape can be driven in opposite directions efficiently.

It is still another object of the present invention to provide a new and improved cartridge tape player which includes apparatus for effectively driving a tape through a cartridge of the last-mentioned type in opposite directions.

It is yet another object of the present invention to provide a system of the above described type which is relatively simple in construction ahd which is reliable and efficient in operation.

Briefly, a cartridge tape player system according to the invention includes a tape cartridge player having the usual tape playing magnetic head and capstan drive shaft driven rotatably by a flywheel attached thereto which is coupled to a drive motor by a belt. The player is modified to include a retractable drive shaft which, upon depression of a first selector, is raised to be received in a slot provided in the central hub of the tape spool and accessible through the housing of a specially modified tape cartridge used in the system. The drive shaft is coupled to the drive motor by another belt to drive the hub in the opposite direction from that in which it is normally driven by the capstan drive shaft of the player. At the same time the first selector is operated to raise the drive shaft, the cartridge is urged away from the capstan shaft and tape head against the force of the cartridge retaining mechanism normally provided in the player, to avoid possible damage to the tape by engagement of the capstan shaft when driving the hub and tape in the reverse direction.

A second selector is provided also which operates the mechanism to urge the cartridge away from the capstan and one which raises the drive shaft for receipt in the drive slot in the central hub of the cartridge. The drive motor, however, is reversed to drive the hub in the same direction as when driven by the capstan shaft, but in a fast-forward mode. A switch, automatically operated upon depression of the fast-forward mode selector, reverses the drive motor.

The standard tape cartridge which normally includes a separate platen on which the tape roll and a hub mounted on the platen and about which the roll is wound, is modified to provide a one-way clutch therebetween which causes the hub and platen to be driven together, as a unit, in the playback and fast-forward modes, but which will slip in the reverse mode. In addition, a guide finger or member is provided which extends toward the hub from a fixed position in the cartridge, between the outer wall of the hub and the innermost tape convolution to provide a separation therebetween. During the reverse mode of operation, the tape is then "tucked" into the separation to rewrap the tape against the hub wall at the innermost portion of the tape roll. A guide ring member has also been provided at the periphery of the tape roll which restrains the roll at the outer convolution and maintains the diameter thereof substantially fixed during reverse operation. During the fast-forward mode, the ring member is expanded to permit the rotation of the roll and hub without interference therefrom. Other guides may be provided also which lay over the edge of the tape roll on the platen to prevent the tape from "riding up" on the hub.

DETAILED DESCRIPTION

Figure 1:
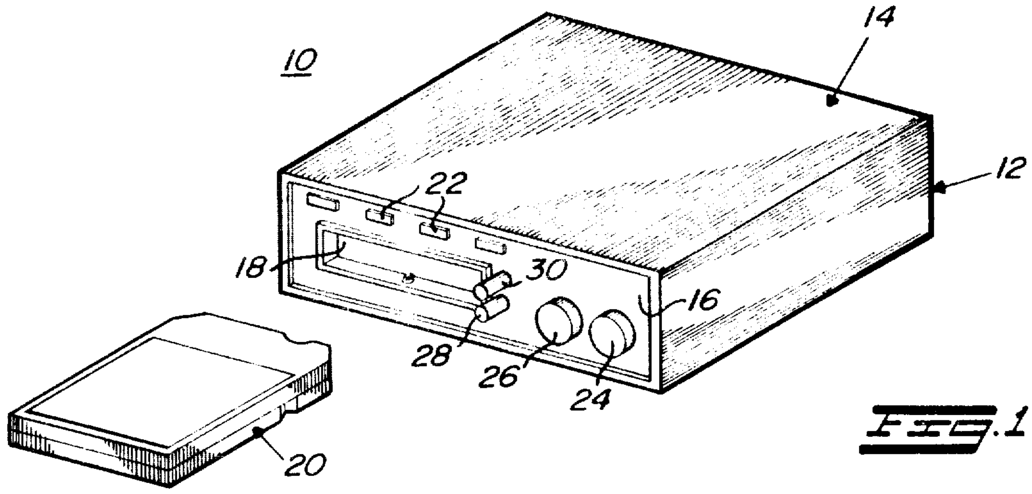
FIG. 1 is a perspective view of a cartridge tape player and tape cartridge employed in a cartridge tape player system according to the invention.

Referring now to the drawings in greater detail wherein like numerals have been employed throughout the various views to designate similar components, in FIG. 1 there is shown a cartridge tape player system 10 according to the invention. The system includes a cartridge tape player having an outer housing 14 of the usual type and in the front wall 16 thereof a cartridge receiving opening 18 into which a multi-track tape cartridge, such as 20, is received for playback. Also provided on the front wall 16 are tape track indicators 22 which indicate the tape track being played at the time by the player. Volume-on/off and tone controls 24, 26, respectively, are likewise provided on front wall 16 along with reverse and fast-forward control buttons 28, 30, respectively.

Figure 2:
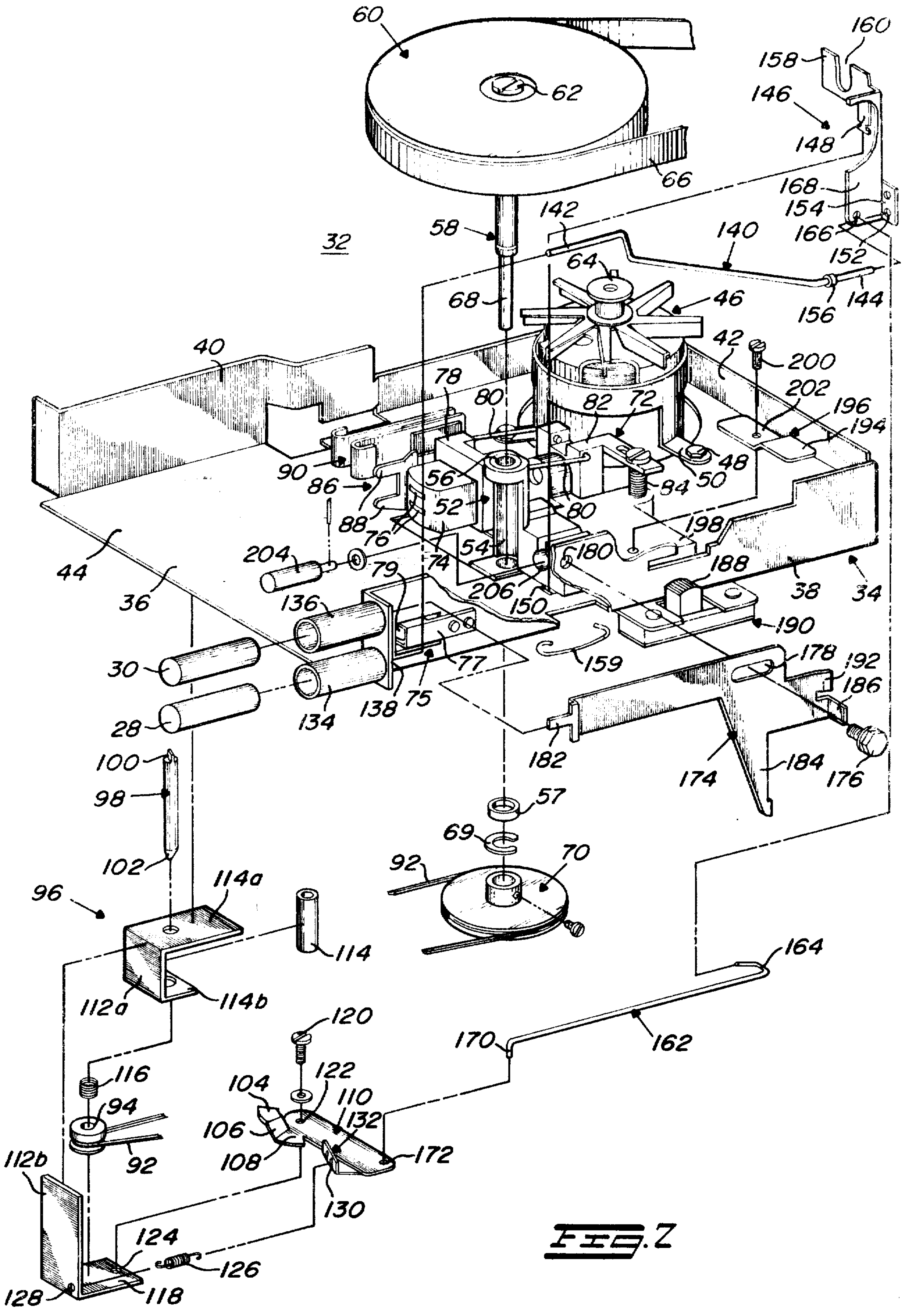
FIG. 2 is an exploded, perspective view of the tape deck portion of the cartridge tape player of the system of FIG. 1.
Figure 7:
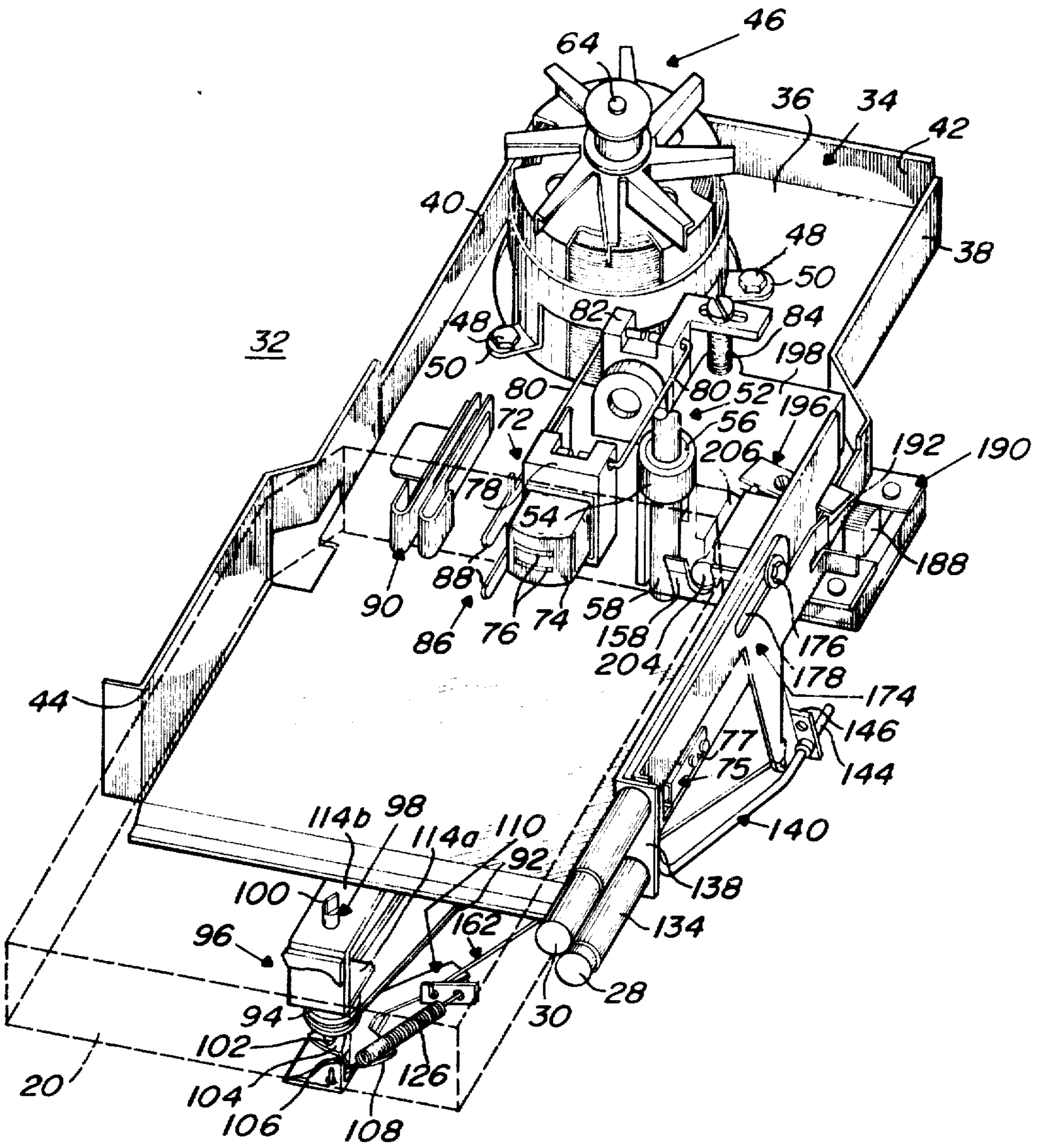
FIG. 7 is a perspective view of the tape deck portion of the cartridge tape player system shown in the reverse mode condition.
Figure 9:
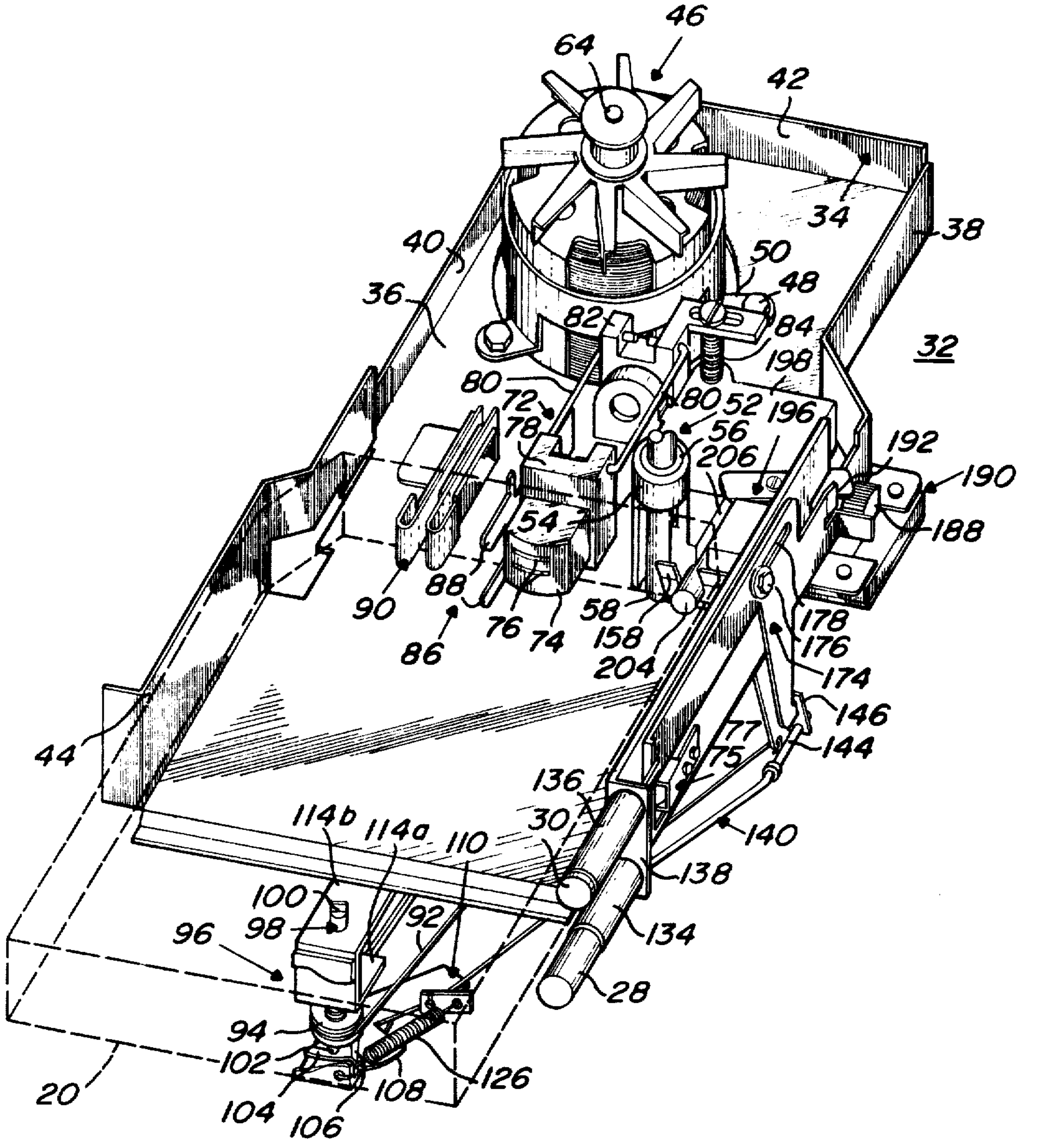
FIG. 9 is a perspective view of the tape deck portion of the cartridge tape player system according to the invention, shown in the fast-forward condition.

Internally of the housing 12, there is provided a tape deck portion 32 (see FIGS. 2, 7 and 9). The tape deck portion includes the usual frame or chassis 34 having a base wall 36, a pair of side walls 38, 40 extending upwardly from the base wall and a rear wall 42 also extending upwardly from the base wall between side walls 38, 40. The side walls 38, 40 and base wall 36 form a cartridge receiving tunnel or cavity 44 into which a cartridge such as 20 is received.

Mounted on base wall 36 of the frame or chassis 34, near the rear wall 42, is a drive motor 46 of the conventional type. The drive motor is bolted to the base wall 36 by suitable fasteners 48 passing through mounting feet 50 extending outwardly from the drive motor.

Figure 3:
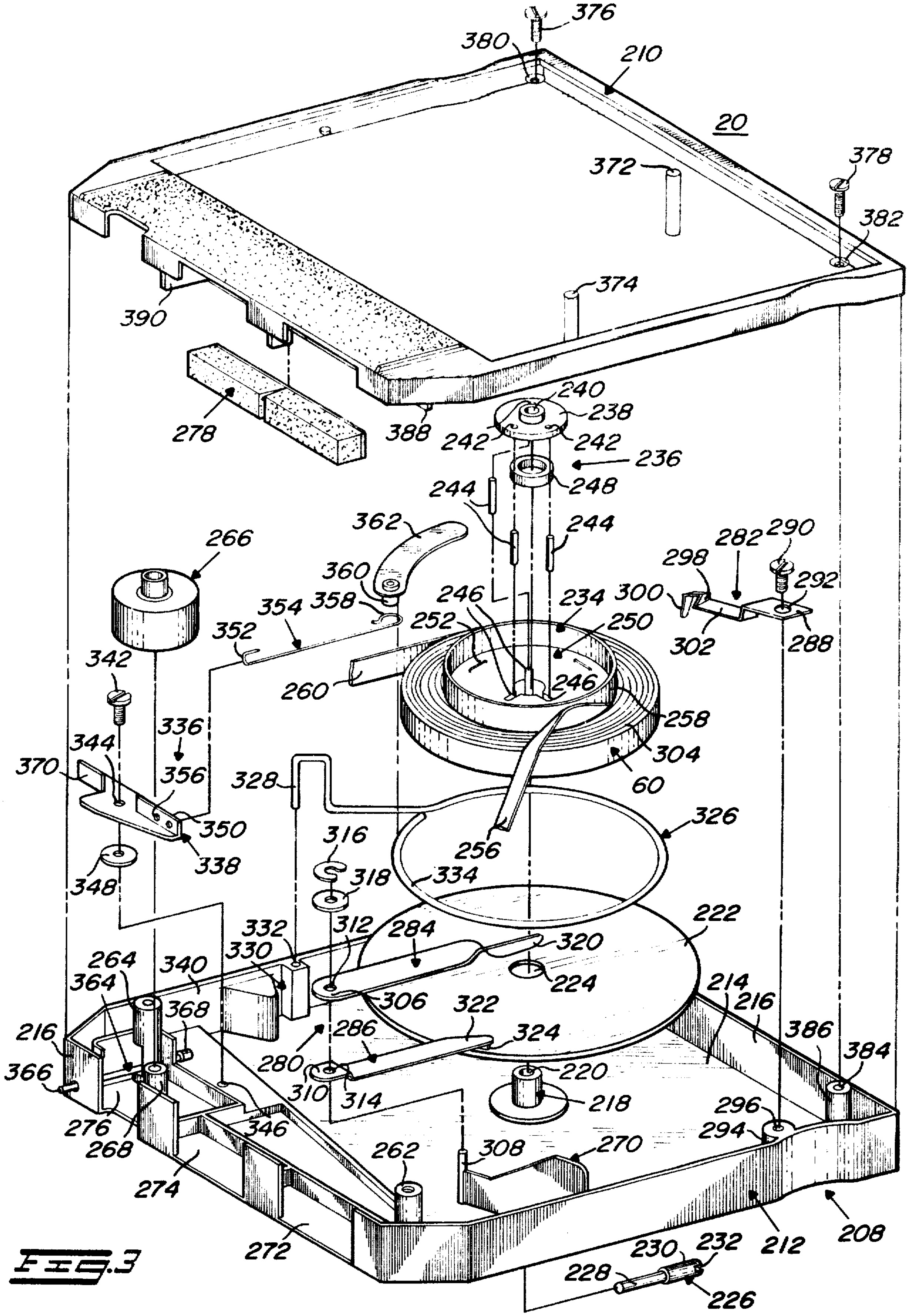
FIG. 3 is an enlarged, exploded perspective view of the tape cartridge of FIG. 1.

A capstan drive shaft assembly 52 is also mounted on base wall 36 in front of the drive motor 46. The capstan assembly includes the usual capstan housing 54 mounted on the base wall and extending upwardly therefrom having upper and lower bearings 56, 57, respectively, for receiving a capstan drive shaft 58 used for driving the magnetic recording tape 60 (See FIG. 3) through tape cartridge 20 inserted into the player cavity 44. A flywheel 60 (FIG. 2) of the conventional type is attached to the upper end of the capstan shaft by a suitable fastener 62 and provides the force necessary to drive the capstan rotatably. The flywheel is coupled to the output drive shaft 64 of the drive motor 46 by a drive belt 66. Rotation of the drive motor imparts rotation to the flywheel and capstan shaft. The drive shaft 58 of the cartridge tape player system according to the invention, is elongated to provide an extension piece 68 which extends downwardly through the base wall and therebeyond. A C-washer 69 maintains the capstan shaft in a predetermined position relative to the base wall 36. A pulley wheel 70 is attached to the extension piece 68 at the free end thereof for rotation therewith.

The function of the pulley wheel 70 will be described in greater detail hereinafter.

In addition to the capstan assembly 52, there is mounted on base wall 36 a magnetic tape head assembly 72, also on a conventional type. The tape head assembly includes a magnetic tape head 74 having a plurality of magnetic pickups 76 for transforming magnetically recorded information on the tape 60 in cartridge 20 to electrical signals which are thereafter translated by suitable circuitry (not shown) into audible sound. The magnetic tape head is mounted in a mounting fixture 78 which in turn is connected by a plurality of parallel extending arms 80 to a stationary fixture 82 mounted on base wall 36. The tape head 74 and fixture 78 are movable in a vertical direction with respect to the horizontally extending tape 60 for aligning the magnetic pickups 76 with respective tape tracks on the tape for selectively playing back information thereon. An alignment adjustment screw 84 is provided in the assembly 72 for adjusting the position of the tape head with respect to the tape tracks. Other tape head mounting fixtures than that shown in the drawings may be employed, if desired, as well.

Next to the tape head 74 is a tape guide 86, also mounted on base wall 36. The tape guide has a pair of spaced arms 88 between which the tape 60 travels. The guide ensures alignment of the tape with the pickups 76 of the tape head.

Adjacent the tape guide, on the side opposite of tape head 74, is an end of tape sensing device 90 which is used to sense a section of magnetic foil or the like (not shown) provided at the end of the tape tracks on tape 60 for actuating circuitry (not shown) to operate a solenoid (not shown) which adjusts the position of tape head 74 with respect to tape 60.

Mounted on the side wall 38 of the tape player chassis is a cartridge retaining assembly 75 including a leaf spring arm 77 coupled at one end thereof to side wall 38 and including on the opposite free end a roller 79. The roller 79 is received in a groove or notch 81 formed in the side wall of cartridge 20, to bias the cartridge into contacting relation with the capstan shaft and other tape playing instrumentalities during playback.

As described heretofore, a pulley wheel 70 is attached to the extension 68 of the capstan drive shaft 58 of the player. The pulley wheel is coupled via a drive belt 92 to a drive hub 94 included in a reverse/fast-forward driver shaft assembly 96 coupled to the base wall 36 of the tape deck chassis, near the open end of the cartridge receiving tunnel 44.

The reverse/fast-forward driver shaft assembly 96 comprises a driver shaft 98 having a driver tab 100 on the upwardly extending free end thereof. The opposite end of the driver shaft includes a conical bearing surface 102 which rides on cam surfaces 104, 106 and 108 provided on a pivotal actuator plate 110, the function of which will be described hereinafter.

The driver shaft 98 is received in hub 94 and is fixed with respect thereto. The hub and driver shaft are mounted on a two piece bracket assembly **112*a***, 112*b*. The driver shaft extends through a bearing sleeve which is positioned between the outwardly extending parallel arms **114*a***, 114*b* of the bracket piece **112*a* and the hub 94 is attached to the lower end of the driver shaft beneath arm 114*b*. A coil biasing spring 116 is received on the shaft 98 and is positioned between the hub 94 and arm 114b of bracket piece 112b. Bracket arm 114a is attached to the base wall 36** of the player deck chassis by welding or other means (see FIGS. 7 and 9) to secure the bracket assembly thereto.

The pivotal cam actuator plate 110 is mounted on the outwardly extending arm 118 of bracket piece 112b by means of a screw 120 extending through an aperture 122 in the plate and received in a threaded aperture 124 in the arm 118. A biasing spring 126 extends between the bracket piece 112b and the pivotal cam actuator plate 110 for normally biasing the last-mentioned plate in a first position whereat the end 102 of driver shaft 98 rests on the lower cam surface 108 of the actuator plate. One end of the biasing spring 126 is inserted in aperture 128 while the opposite end of the spring is received in an aperture 130 in a tab 132 extending from the plate 110.

As mentioned above in describing FIG. 1, there is provided in the cartridge tape player portion of the system according to the invention, reverse and fast-forward control buttons 28, 30, respectively. These buttons are mounted for sliding movement in respective housings 134, 136, attached by welding or the like to a tab 138 extending from the side wall 38 of the player chassis or frame 34.

The reverse button 28 is attached to an actuator rod 140 at a first end 142 thereof. The last-mentioned end of the rod extends into the housing 134 whereat button 28 is mounted. The opposite end 144 of the rod is received in a tape cartridge engaging bracket member 146. The last-mentioned bracket member is mounted on the base wall 36 of the chassis with a depending tab 148 thereof being received in and extending through an aperture 150 in the base wall (See FIG. 2). The end 144 of the actuator rod 140 is received in an aperture 152 in an outwardly extending tab 154 of the bracket member 146. A stop 156 on the rod engages the tab 154 upon depression of the button 28, causing the bracket member 146 to be pivoted on base wall 36 about depending tab 148. A portion 158 of the pivotal bracket member 146 is positioned adjacent the capstan drive shaft housing 52 for engagement with the leading end of a tape cartridge 20 inserted into the player. Movement of the bracket as described causes the cartridge to be moved away from the capstan drive shaft to a predetermined location. The movement of the cartridge also prevents engagement of the capstan drive shaft with the magnetic tape 60 and pressure roller within the cartridge during reverse drive operation. A return spring 159 attached to tab 148 returns the bracket to a normal position upon release of button 28. A space or opening 160 is provided in the cartridge engaging portion 158 of the bracket member 146. The purpose of this space will be described hereinafter.

A driver shaft assembly actuator rod 162 is also connected at a first end 164 thereof to the pivotal bracket member 146. End 164 is received in an aperture 166 in a side plate 168 of the bracket member. The opposite end 170 of the actuator rod 162 is attached to the pivotal cam actuator plate 110; end 170 being received in an aperture 172 provided therein. Thus, in addition to moving the cartridge away from the capstan drive shaft to a predetermined location, depression of the reverse button 28 causes cam actuator plate 110 to be pivoted, moving cam surfaces 106, 104 into respective sequential engagement with the bearing end 102 of the driver shaft 98 to move the shaft longitudinally upwardly, as will be described hereinafter, into operative engagement with a slotted drive pin mounted in the hub of the tape spool assembly in the tape cartridge 20 of the system.

The fast-forward button 30, as mentioned heretofore, is mounted in housing 36. The button 30 is coupled to an actuator plate 174 which is attached to the side wall 38 of chassis 34 of the tape player for sliding movement therealong. The plate is coupled to the wall by a screw fastener 176 extending through an elongated aperture 178 in the plate and received depression of threaded aperture 180 in the wall 38. One end 182 of the plate is coupled to button 30 and a downwardly extending arm 184 is positioned for engagement with the pivotal bracket member 146 at tab 154 thereof.

A finger portion 186 extending outwardly from the plate 174 is positioned for engagement with the actuator button 188 of an electrical switch 190 attached to and extending outwardly from base wall 36 of the chassis at side wall 38 thereof. The switch is spring biased into a first position shown in FIG. 2 and is operated to a second position, (See FIG. 9) upon depression. oof button 30. The function of the switch is to reverse the direction of drive motor 46 when operated from the first to the second position. The reason for the provision of the switch will be explained in greater detail hereinafter.

Figure 10:
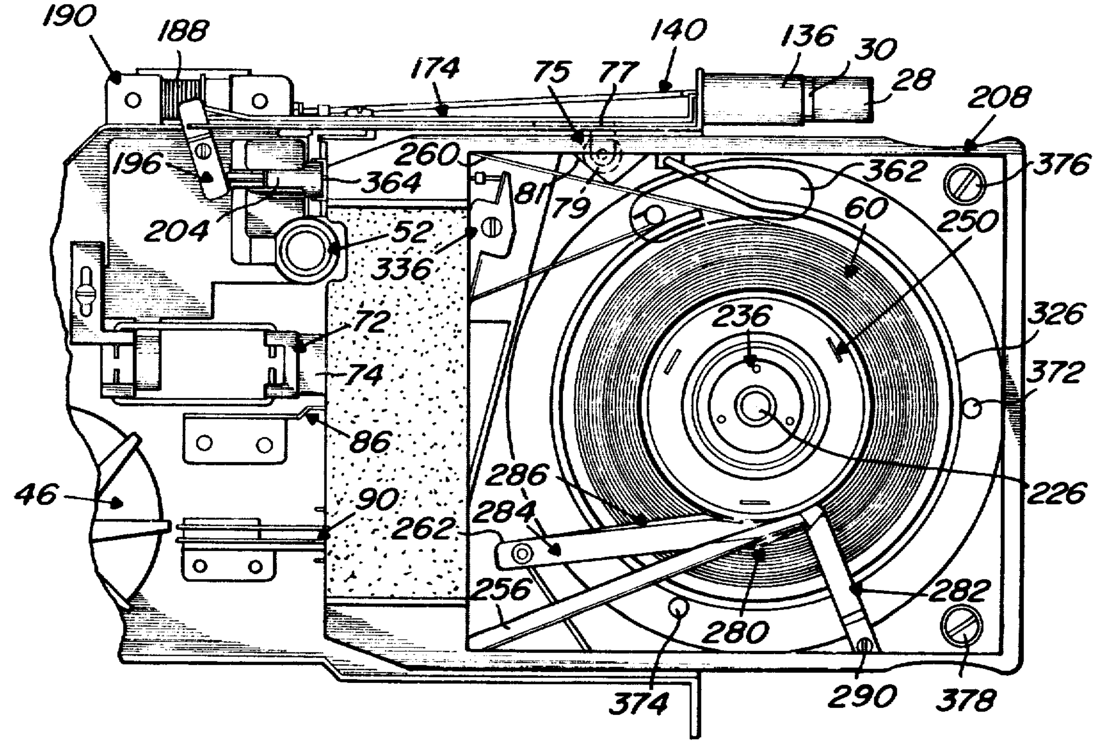
FIG. 10 is a top view of the tape deck portion and the tape cartridge of the system, in the fast-forward condition.

In addition to the finger 186, a second, shorter finger 192 extends from plate 174 and is located above finger 186 (See FIG. 2). The second finger is provided for engagement with a first end 194 of a lever arm 196 mounted on a fixture 198 formed integrally with the capstan housing 52 and mounted on base wall 36 of the chassis. The lever arm 196 is fastened to the fixture by a screw 200. The opposite end 202 of the lever arm is positioned for engagement with a pin 204 (see FIGS. 9,10) mounted in a specially formed cavity 206 in the fixture. The pin 204 is extendable into the cartridge receiving cavity 44 of the player chassis toward a cartridge inserted into the cavity, and through opening 160 in the cartridge engaging portion 158 of the pivotal bracket 146. The function of pin 204 will also be described in greater detail hereinafter.

Upon depression of button 30, plate 174 is moved slidably along wall 38 of the chassis so that arm 184 engages the pivotal bracket 146 causing the latter to be pivoted, just as in the case when reverse button 28 is depressed. Thus, cartridge 20 is moved away from the capstan drive shaft and the driver shaft 98 is raised. Also, upon depression of button 30, finger 186 engages the actuator 188 of switch 190 to reverse the operation of drive motor 46 and finger 192 engages the end 194 of lever arm 196 to pivot the latter from a first position to a second position into engagement with pin 204, thereby moving the pin into the tape cartridge cavity 44 toward a tape cartridge inserted thereinto. Upon release of the pushbutton 30, a spring (not shown) coupled to the pin 204 returns the latter to its normal position, out of the cartridge receiving cavity and out of engagement with a cartridge inserted thereinto.

A preferred embodiment of the tape cartridge 20 used in the tape player system according to the invention is similar in some respects to a standard 8-track cartridge but has been modified somewhat to provide the reverse and fast-forward functions.

The cartridge 20 includes the usual housing 208 fabricated of plastic or a suitable material and having upper and lower joined cover portions 210, 212, respectively. The lower cover portion 212 includes a base wall 214 surrounded by side walls such as 216 extending upwardly therefrom. Mounted fixedly on base wall 214 near the central area thereof is a bearing portion 218. The bearing portion includes a central aperture 220 extending therethrough. The aperture is aligned with an aperture formed in and extending through base wall 214. A circular disc or plate of plastic or the like material having a central aperture 224, is received on bearing 218 for rotation thereabout.

A driver pin member 226 is received in the central portion of bearing 218 with a first end 228 thereof extending upwardly beyond the free end of the bearing. The opposite end 230 of the pin member 226 includes a slot 232 formed therein which is accessible from the outer surface of wall 214 of the cover portion 212. The slot is dimensioned for receipt of the tip 100 of the driver shaft 98 (FIG. 2).

A central tape hub 234 is received on pin 226 and is coupled thereto for rotation therewith. The hub is fastened to the pin end 288 by means of an assembly 236 including a small disc having a central aperture 240 therethrough and three smaller apertures 242 spaced about the disc 120° apart. Three small pins 244 are received in the apertures 242 and are fixed therein. The opposite ends of the pins are received in similarly spaced slotted apertures 246 formed in the central area of hub 234. The end 228 of pin member 226 is force fitted into the central aperture 240 of disc 238 so that rotation of the pin member 226 imparts rotation to disc 238 and in turn through pins 244, to hub 234.

Figure 5:
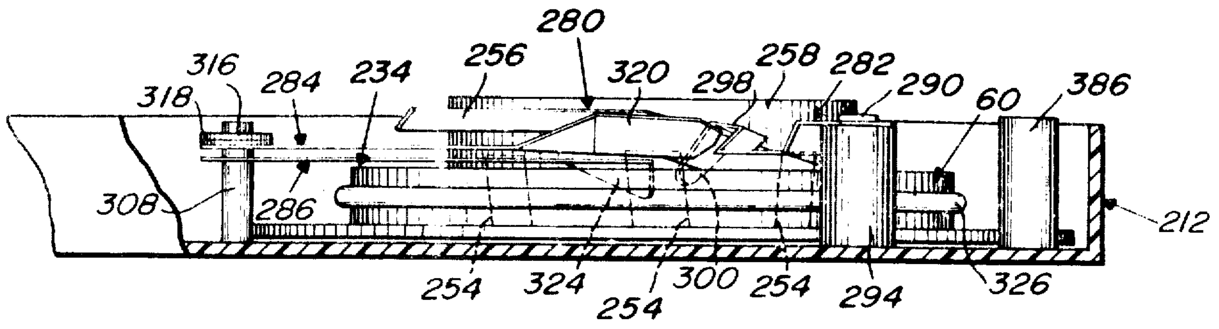
FIG. 5 is a side view of the tape cartridge of FIG. 4 with the side wall and upper cover portion removed.

A spacer ring 248 is provided between the disc 238 and the hub 234. The hub rests on disc 222 and a one-way clutch arrangement 250 is provided therebetween so that rotational movement of the hub in a play or fast-forward direction engages the clutch to impart rotation to the disc 222 as well. In a reverse mode, the clutch is disengaged so that hub 234 is rotated separately from disc 222. In the preferred embodiment of the cartridge according to the invention, the one-way clutch comprises a plurality of wire staple-like members 252 which are inserted into a central area of the hub 234 and spaced thereabout. The wire legs or ends 254 of the stables (see FIG. 5) engage disc 222 when rotation of the hub is in a first direction (play or fast-forward mode) and slip along the surface of the disc 222 when rotation of the hub is in a second opposite direction (reverse mode).

The continuous loop of tape 60 mentioned heretofore, is of the conventional type found in standard 8-track tape cartridges. The tape is wound about hub 234 as shown in the figures and one portion 256 thereof extends outwardly from the central or innermost convolution of the wound tape adjacent the hub wall 258 and another portion 260 extends from the outer convolution of the wound tape. In the normal play or fast-forward modes, the tape is pulled from the hub at the inner convolution and is returned to the hub at the outer convolution. In the reverse mode, the tape travels in the opposite direction.

When the tape leaves the hub, it extends along a path defined by posts 262, 264, pressure roller 266 mounted for rotation on post 268 and guide 270. The tape passes a plurality of openings 272, 274 and 276 in the front wall of the tape cartridge. Upon insertion of the cartridge 20 into the tape player, the end of tape sensor device 90, magnetic tape head 74 and capstan drive shaft 58 are aligned with the opening 272, 274, 276, respectively. A rubber or the like pressure pad assembly 278 is provided in cartridge 20 in alignment with apertures 272, 274. The tape passes over the pad assembly and is held thereby in contacting engagement with the sensing device 90 and tape head 74, respectively, as the tape moves thereby.

As mentioned heretofore, upon depression of button 28 to place the tape player in a reverse mode, the tape 60 is driven in a reverse direction through the cartridge; i.e. the tape is drawn from the cartridge at the outer convolution 260 and is returned to the hub 234 at the inner convolution 256. In order to accomplish the latter, it is necessary to, in effect, tuck the tape between the innermost convolution and the outer wall 258 of the hub. To this end, there is provided, within cartridge 20, a tape guide assembly 280. A preferred embodiment of the assembly 280 includes three guide fingers 282, 284, 286, which guide the tape into a space produced between the innermost convolution of the tape and the hub wall.

The first-mentioned guide finger 282 is mounted at one end 288 by a suitable fastener 290 extending through an aperture 292 therein, on a post 294 provided in the lower cover portion 212 of the cartridge. The screw 290 is received in threaded aperture 296 in the post 294. The other, free end 298 of the guide finger is curved into a U-shape, with one leg 300 of the U extending downwardly between the innermost convolution of the tape and the hub wall 258. The central portion 302 of the finger 282 rests on the edges of the wound tape to maintain the edges at a uniform height. The U-shaped end of the finger 282 is tapered toward the hub and tape 60 is fed into the wider area of the U and eventually between the hub and innermost convolution of the tape. Guide finger 284 is mounted at one end 306 to a pin 308 formed with and extending upwardly from base wall 214 of the cover portion 212 adjacent tape guide 270. Guide finger 286 likewise is mounted at one end 310 to the pin 308. The pin 308 extends through apertures 312, 314 in fingers 284, 286, respectively, and a pair of washers 316, 318, maintain the fingers coupled thereto.

The free end 320 of guide pin 284 is twisted and curved to extend into the U-shaped end of finger 282 for guiding the tape which extends between post 262 and hub wall 258, into the wider portion of the tapered U-shaped end of the finger 282. The free end 322 of guide finger 286 is positioned beneath finger 284 and is bent to have a downwardly extending end portion 324 which extends between the innermost convolution of tape 60 and the hub wall 258 along the periphery of the hub, upstream of the position of the ends of guide fingers 282, 284, when the hub is being rotated in the reverse mode, (counterclockwise as shown in the figures of the drawing, see FIGS. 3 and 5). The last-mentioned guide finger preliminarily separates the innermost convolution of the tape from the hub wall prior to returning the incoming tape to the hub.

In addition to the guide finger assembly 280, a resilient expansion ring 326 of plastic, metal or a suitable material is provided in the tape cartridge. The expansion ring is provided to control the outside diameter of the tape 60 and to prevent tape spillage by supplying drag to the tape when it is rotated in the reverse mode. The expansion ring is formed from a single piece of od-like material. It is fastened at a first end 328 to an upstanding post 330 formed in the lower cover portion 212 of the cartridge. End 328 of the ring 326 is received in an aperture 332 provided in the post 330. The opposite end 334 of the ring is coiled about to form the ring. The ring may be expanded by pulling outwardly on end 334 thereof to release the outer diameter of the tape 60. The ring is released in the play-back and fast-forward modes to permit free rotation of the tape.

To expand the ring, there is provided an actuating assembly designated generally by the numeral 336. The assembly includes a pivotal lever arm 338 which is mounted on the cover portion 212 of the cartridge on a platform 340 formed on the base wall 214 thereof, near the leading edge of the cartridge. The lever arm is mounted for pivotal movement on the platform by a screw 342 extending through an aperture 344 in the arm and into an aperture 346 in the platform portion. A washer 348 is provided between the lever arm and the platform to provide smooth movement of the lever arm between positions.

To a first end 350 of the lever arm, there is connected one end 352 of a connecting rod 354. The end 352 of the rod is curved and is received in an aperture such as 356 in arm 338. The other end 358 of the connecting rod 354 is curved and coupled to a post member 360 which is welded or fastened in some other suitable manner, to end 334 of the ring 326. A plastic or the like tape shield and guide 362 attached to the post member 360 lies over the edge of the tape 60 to maintain the tape in position on hub 234.

In addition to the above elements, the actuating assembly 336 includes an actuating pin 364 which extends through the front wall 216 of the lower cover portion 212 of cartridge 20 with one end 366 thereof normally extending outwardly therefrom. The pin is mounted in the cover portion for sliding movement. The opposite end 368 of the pin is enlarged and positioned for engagement with end 370 of the lever arm 338. Depression of the pin into the cartridge thus causes lever arm 338 to be pivoted so that connecting rod 354 pulls against the resilient ring to expand the latter. Release of the pin permits the inherent resiliency of the ring 326 to return itself to a normal compressed position and to pivot lever arm 338 in the opposite direction. Pin 364 is likewise returned to a normal position with end 366 thereof extending from the cartridge.

Formed with the upper cover portion 210 of the cartridge 20 are a pair of downwardly extending posts 372, 374 placed at predetermined positions, which when the cover portions are joined, place the posts adjacent the outer portion of the ring 326. The posts limit the expansion of the ring 326 at proper points to provide a uniform expansion thereof. This ensures that the tape 60 remains uniformly wound about hub 234.

Figure 4:
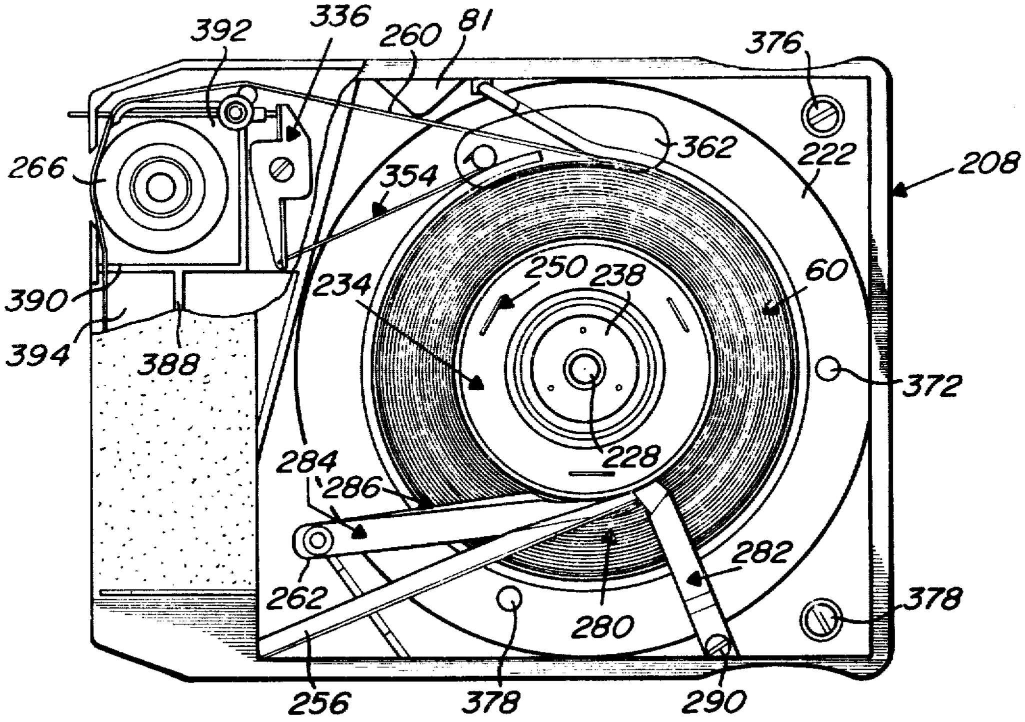
FIG. 4 is a top, partially fragmented view of the tape cartridge of FIG. 3.

The cover portions are joined by a pair of screws 376, 378, extending through appropriate apertures 380, 382, respectively, in the upper cover portion 210 and into threaded apertures, such as 384, in predeterminedly spaced posts such as 386 formed in the lower cover portion 212. In addition to the posts 372, 374, there are other internal wall portions such as 388, 390 formed in upper cover portion 210. These wall portions form cavities, such as 392, (See FIG. 4), in which the pressure roller is mounted and 394, through which the tape 60 passes over pressure pads 278.

For purposes of affording a more complete understanding of the invention, it is advantageous now to provide a functional description of the mode in which the component parts thus far described cooperate.

Initially, a cartridge, such as 20, is placed into the opening 18 in the front wall of player 12 (See FIG. 1) until the cartridge is fully inserted into a playback position in the cartridge receiving tunnel 44 of the tape deck. The cartridge is fully inserted at such time as the cartridge retaining roller 79 has been received in the notch or groove 81 provided in the side wall of the cartridge. It should be noted that while a spring loaded roller assembly 75 has been shown in the drawings as the means by which the cartridge is retained in the tunnel 44, other suitable cartridge retaining assemblies such as those using over-center spring devices and the like may be used in the tape player system and still fall within the scope of the invention.

Figure 6:
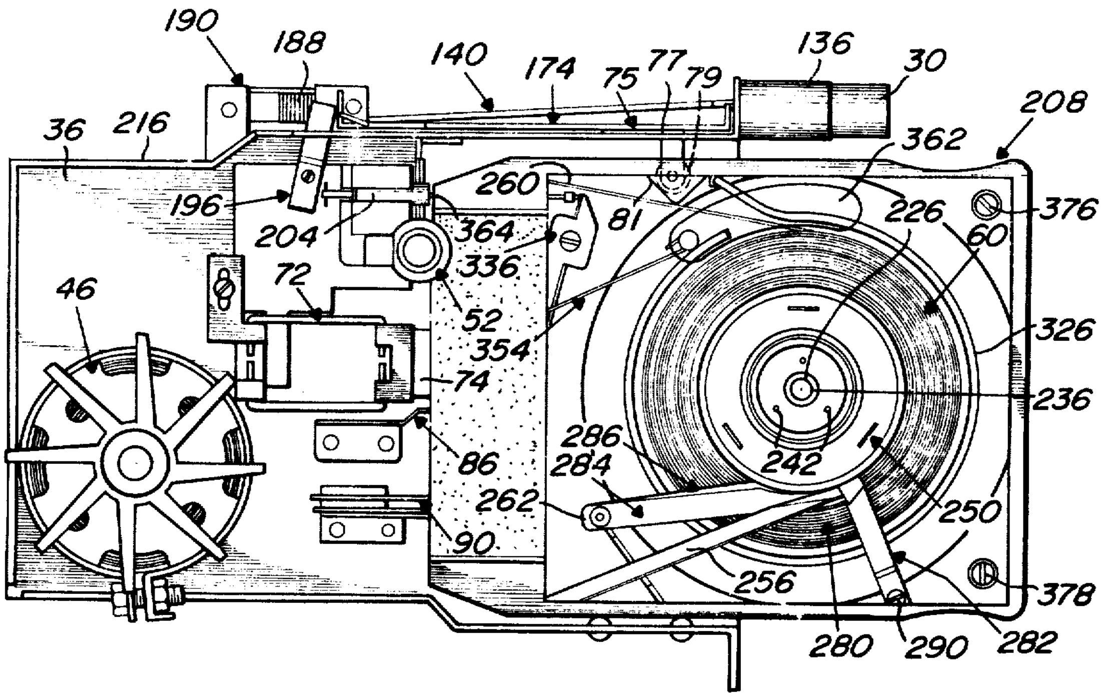
FIG. 6 is a top view of the tape deck portion and cartridge of the system according to the invention, with the tape inserted into the deck in the playback position.

When the cartridge is fully inserted into the player deck, the pressure roller 266 in the cartridge is pressed against the surface of the capstan drive shaft 58 and the tape 60 is positioned into engagement with the magnetic pick-ups 76 of the tape heads 74 as well as with the end of track sensor 90 and tape guide 86, (See FIG. 6). Conventionally, power may be applied to the drive motor 46 by means of a switch (not shown) actuated directly by the cartridge upon insertion thereof into the tunnel 44 or by the manually operated switch 24 on the tape player housing itself. In any case, when power is applied to the drive motor, the latter, through belt 66, drives flywheel 60 rotatably, herein in a counterclockwise direction, to in turn rotate the capstan shaft in a like direction.

Rotation of the capstan shaft as described against the tape 60 and pressure roller 266, moves the tape through the cartridge past the tape head, etc. The tape is moved in a clockwise direction as shown in the drawings, and is drawn from the inner convolution and returned to the outer convolution. Thus, the playback mode of the tape player system of the invention is the same as in the case of a conventional 8-track cartridge tape player system. As such, conventional cartridges may likewise be played in the tape player according to the invention, in the playback mode.

When the system is in the playback mode, the actuator pin 364 in cartridge 20 which controls the expansion and contraction of the ring 326, is engaged by pin 204 and as such, the actuator pin is depressed inwardly of the cartridge to hold the ring 326 in an expanded position. Thus, the ring has no affect on the tape 60 during playback. Also, clutch 250 is operative to join hub 234 and platen 222 of the tape assembly for rotation together during the playback mode.

When it is desired to reverse the direction of travel of the tape in the cartridge, for the purpose of replaying a desired section of the tape or in the case of a player-recorder, to re-record a section of the tape, one merely depresses the reverse button 28. No stopping of the playback operation need first be executed.

Upon depression of the reverse button 28, (See FIGS. 7 and 8), actuator rod 140 is shifted to pivot bracket member 146 and to rotate cam actuator plate 110. The pivotal movement of bracket 146 causes portion 158 thereof to engage the front edge or end of cartridge 20, forcing the cartridge in a direction outwardly of tunnel 44 so as to disengage the pressure roller 266 and capstan shaft 58, and the tape 60 and tape head 74, etc. The cartridge is forced against the resilient biasing force of spring-loaded roller assembly 75. Upon being moved outwardly of tunnel 44, expansion ring actuator pin 364 is released so that ring 326 is permitted to be moved to a closed condition about the tape.

Movement of the cartridge as described, repositions it to a predetermined location. At this location, the pin 226 extending through the central axis of the hub 234 becomes aligned with the driver shaft 98. Simultaneously with the movement of the cartridge as described, the driver shaft 98 is elevated so that end 100 thereof is inserted into the slot 232 in the pin 226.

So long as power is provided to drive motor 46, flywheel 60 and capstan shaft 58 are rotated. Because the driver shaft 98 is coupled via belt 92 and pulley wheel 70 to the capstan shaft, it too is rotated. The driver shaft is rotated also when the player is in the playback mode, but the rotation thereof has no driving affect since it is disengaged from pin 226 in hub 234. When the reverse mode button is depressed as described, and the driver shaft engages the cartridge hub pin 226, the hub 234 is driven in the opposite direction than in the play mode. Because the driver shaft 98 drives the hub 234 directly, there is an inherent reversal in the direction of travel of the tape 60 through the cartridge. This is advantageous, since in a system wherein it is desired to provide only playback and reverse modes of operation, no motor reversal elements are needed to shift between modes. Also, because of the direct drive arrangement the speed at which the tape travels through the cartridge is increased.

Once engaged by the driver shaft 98, pin 226 drives hub 234 in a counterclockwise direction as shown in the drawings. Thus, tape is removed from the outer convolution and is fed back to the hub 234 at the inner convolution. To accomplish this, guide fingers 282, 284 and 286, separate the tape and hub to permit the incoming tape to be fed therebetween. Expansion ring 326 maintains the outer diameter of the tape substantially constant and portion 302 of guide finger 282 and shield 362 maintain the tape height uniform.

In the reverse mode, the one-way clutch arrangement 250 between hub 234 and platen 222, is disengaged. The disengagement of the one-way clutch prevents platen 222 from moving rotatably directly with the driven hub. In this manner, a more efficient wrapping of the tape on the hub can be accomplished and as such, the guide fingers are able to function more efficiently to tuck the tape between the hub and the inner convolution of the tape.

Immediately upon release of the reverse mode selector button 28, spring 126 returns the driver shaft 98 to its normal position. The shaft end 102 rides along cam surfaces 104, 106 until it engages surface 108, whereby the shaft is lowered vertically out of engagement with pin 226. Likewise, bracket member 146 is returned to its normal position permitting spring loaded cartridge retaining roller assembly 75 to return the cartridge to its fully inserted position. At this time, the capstan shaft 58 once again engages pressure roller 266 and the tape immediately is driven through the cartridge in a clockwise direction and the system is returned to a playback mode of operation.

Figure 8:
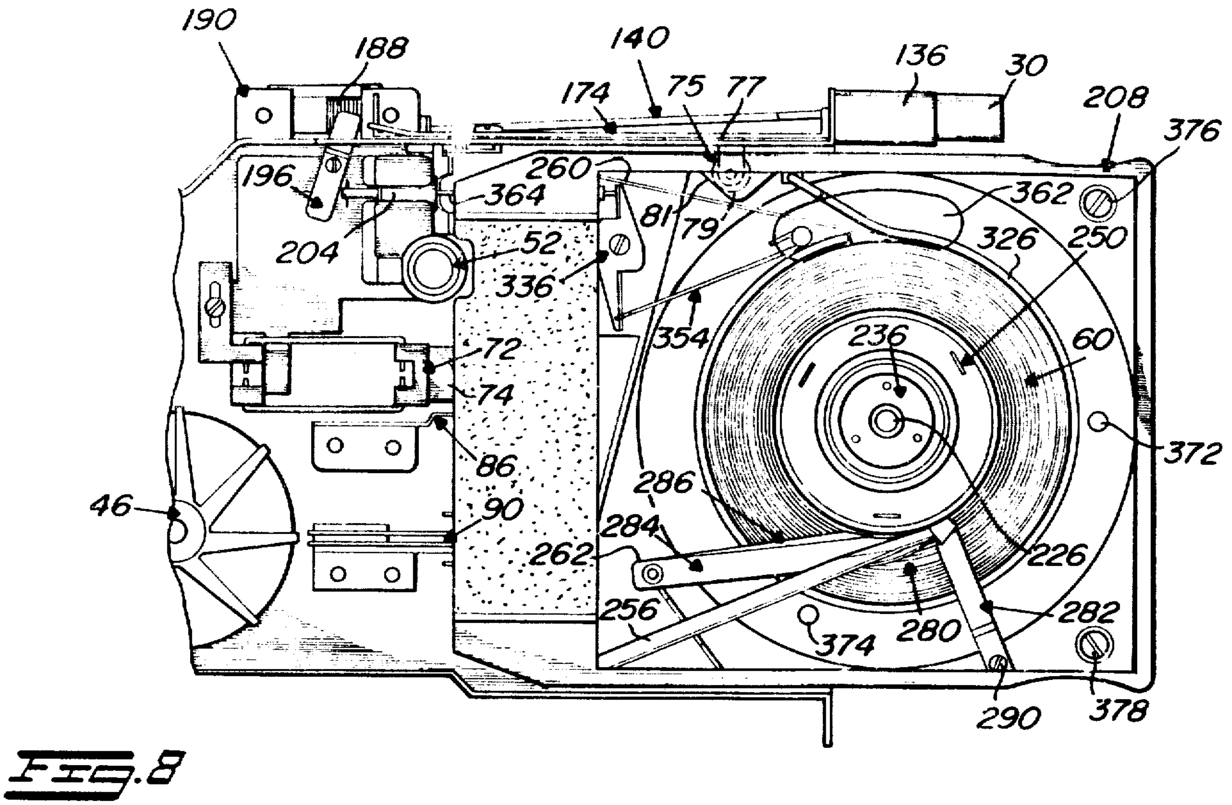
FIG. 8 is a top view of the tape deck portion and tape cartridge of the system, in the reverse mode condition.

The relative movement of the tape cartridge 20 out of the tunnel when shifting the system from the playback mode of operation to the reverse mode can be seen by comparing the drawings in FIGS. 6 and 8. As will be noted, also, the expansion ring 326 is shifted from an open or expanded position in FIg. 6 during playback, to a constricted position during the reverse mode in FIG. 8.

When it is desired to avoid having to listen to the recorded information on certain sections of the tape, or to advance the tape rapidly, one may depress the fast-forward button 30. When this occurs, actuator plate 174 is moved slidably along the side wall of the tape deck to engage the bracket member 146, causing the last-mentioned member to be pivoted to once again move cartridge 20 away from the capstan shaft 58 and the tape head, etc. Likewise, by the pivotal movement of bracket 146, actuator rod 162 is pulled causing cam actuator plate 110 to be rotated. The rotation of the actuator plate causes the cam surfaces 106, 104 to engage successively, end 102 of driver shaft 98 thereby elevating the latter shaft, just as in the case of the reverse mode operation. At this time, the cartridge has been positioned in the predetermined location described heretofore so that end 100 of driver shaft 98 is received in the slotted end 232 of hub driver pin 226.

In addition to the above, one finger 186 of actuator plate 174 engages actuator button 188 of switch 190 to reverse the direction of rotation of drive motor 46. This in turn causes the capstan shaft 58 and driver shaft 98 to be driven in a direction opposite from that when in the playback mode. Reversal of the drive motor is necessary to drive the tape 60 at the hub 234 in the same direction as in the case of the playback mode, wherein the tape is driven by the capstan. As in the case of the playback mode, it is desirable for proper winding of the tape on the hub to rotate platen 222 upon which the tape rests, with the hub 234. Thus, as in the case of the playback mode, one-way clutch 250 is operative to join the two elements in rotation.

It is also desirable in the fast-forward mode of operation to avoid restrictions on the outer diameter of the tape 60. As such, expansion ring 326 must remain expanded to prevent interference thereby with the tape. Because, however, the cartridge is moved away from the pin 204 to release pin 364, the expansion ring would normally become constricted. To prevent this, finger 192 on actuator plate 174 engages the end 194 of the lever arm 196 causing the opposite end 202 thereof to engage pin 204 and move it slidably in its housing with the cartridge 20, thereby maintaining a force against pin 364 to prevent construction of the expansion ring 326 during fast-forward operation.

During fast-forward operation, the tape is moved from the inner convolution to the outer convolution just as in the playback mode with the exception that the tape is driven at hub 234 and capstan shaft 58 is separated from the pressure roller within the cartridge. The driving of the tape hub 234 provides a greater tape speed than that provided during the playback mode by means of capstan shaft 58.

Release of the button 30 immediately restores driver shaft 98, the motor reverse switch 190, pin 204 and bracket 146 to their normal, playback positions, and the tape player thereby is returned to the playback mode.

The reverse and fast-forward functions provided in the cartridge tape player system according to the invention make the system especially desirable for use in a player-recorder combination. With standard 8-track cartridge player systems, the recording function is not employed in most cases, since one cannot reverse the direction of the tape in the conventional cartridge and as such when it is desired to erase or record over a section of tape, one must permit the tape to travel through the cartridge until such time as that particular section of tape returns to the proper position for re-recording.

In the tape player system of the invention, the basic elements of a standard cartridge tape player system are retained. Only the modifications described heretofore are made to the standard player and cartridge to provide the highly desirable reverse and fast-forward functions. These functions, as has been shown, likewise are obtainable without having to stop the player during the playback mode. The functions are accomplished merely by the depression of a button, easily accessible to one operating the player device.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A cartridge tape player system including in combination: a tape cartridge comprising an outer housing, rotatable hub means mounted within said housing, a continuous loop tape wound about said hub means, a pressure roller mounted for rotation in said cartridge at a predetermined location adjacent an opening in one wall of said housing, said pressure roller being spaced from said continuous loop tape wound about said hub means and said tape extending along a predetermined path from said hub means about said pressure roller and back to said hub means, said pressure roller being accessible through said opening for engagement thereof for driving said tape through said cartridge in a first direction at a first predetermined speed and said hub means in a corresponding first rotational direction, and a cartridge tape player including a cartridge receiving cavity, tape playing and driving instrumentalities including a capstan drive shaft mounted on said player in communication with said cavity for engagement with the pressure roller in said cartridge upon insertion of the latter fully into said cavity, said tape being driven by said capstan shaft in said first direction through said cartridge and being removed from said hub means at the inner convolution and returned thereto at the outer convolution during a normal playback mode of operation of said player and an auxiliary drive assembly for reversing the direction of travel of said tape through said cartridge including auxiliary drive means, means for coupling said auxiliary drive means to said hub means for driving said hub means in a rotational direction opposite from said first rotational direction and means for actuating said coupling means, said tape thereby being driven from said hub means at the outer convolution and returned to said hub means at the inner convolution.

2. A cartridge tape player system as claimed in claim 1 wherein said tape cartridge further includes guide means mounted within said cartridge including a portion for guiding said tape between the inner convolution thereof and said hub means upon driving said hub means with said auxiliary drive means in said reverse direction.

3. A cartridge tape player system as claimed in claim 2 wherein said guide means includes a first guide finger mounted at one end in said cartridge housing at a point spaced from said wound tape, the opposite end of said guide finger including a portion extending between the inner convolution of said tape and said hub means for separating the tape from the hub means, thereby to permit tape being returned to said hub means during the reverse mode of operation to be wound about said hub means.

4. A cartridge tape player system as claimed in claim 3 wherein said opposite end of said guide finger is U-shaped with one leg of said U extending between said hub means and said inner tape convolution, the base of the U overlying said wound tape and said U being tapered in the direction of movement of said tape in the reverse mode of operation for guiding the tape being returned to said hub means through said U for winding about said hub means.

5. A cartridge tape player system as claimed in claim 4 wherein said guide means further includes second and third guide fingers each mounted at a first end at a location in said cartridge different than that whereat the one end of said first guide finger is mounted, the opposite end of said second guide finger being curved for receipt in the U-shaped end of said first guide finger for guiding the tape being returned to said hub means into said U and the opposite end of said third finger extending between said hub means and the inner convolution of said tape upstream of said opposite end of said first guide finger during the reverse mode of operation for preliminarily separating the inner convolution of said tape and hub means prior to returning the tape to said hub means.

6. A cartridge tape player system as claimed in claim 1 wherein said actuating means includes first actuator control means for actuating said coupling means to couple said auxiliary drive means to said hub means thereby driving said hub means in said reverse direction and second actuator control means for actuating said coupling means to couple said auxiliary drive means to said hub means for driving said hub means in said first direction, said second actuator control means including means coupled to said auxiliary drive means for changing the rotational direction of said hub means, thereby to drive said hub means in said first rotational direction, the rotation of said hub means in said last-mentioned direction transporting said tape through said cartridge in said first direction at a speed greater than said first predetermined speed.

7. A cartridge tape player system as claimed in claim 6 wherein said auxiliary drive means includes a rotatable drive member mounted for movement into and out of a coupled relation with respect to said hub means, said auxiliary drive means being coupled to said capstan drive shaft for rotation therewith, wherein said first actuator control means includes a member operated between first and second positions, said member being coupled to said auxiliary drive means for moving said last-mentioned drive means into a coupled relation with respect to said hub means upon moving said member from said first to said second position.

8. A cartridge tape player system as claimed in claim 7 wherein said cartridge tape player further includes drive motor means coupled mechanically to said capstan drive shaft for driving said shaft rotatably normally during said playback mode of operation in a first direction and wherein said second actuator control means includes a member operated between first and second positions and being coupled to said auxiliary drive means for moving said last-mentioned drive means into a coupled relation with respect to said hub means upon moving said member from said first to said second position and wherein said second actuator control means further includes switch means coupled electrically to said drive motor, said switch means being operable in response to the movement of said second actuator control member to said second position to reverse the direction of said drive motor, whereby said capstan shaft and auxiliary drive means are driven in an opposite rotatable direction.

9. A cartridge tape player system as claimed in claim 7 wherein said cartridge includes a central shaft to which said hub means is attached for rotation therewith, said central shaft being accessible from the outside of said cartridge housing for driving said hub means rotatably within said cartridge and wherein said auxiliary drive means includes a rotatably driven auxiliary drive shaft coupled mechanically to said capstan shaft for rotation therewith, said auxiliary drive shaft being movable into and out of engagement with said central shaft of said hub means when said cartridge is inserted into said cartridge receiving cavity in said player, said auxiliary drive shaft being moved into driving engagement with said central shaft upon actuation of said first and second actuator control means, respectively, for driving said hub means in said first and second rotational directions, respectively.

10. A cartridge tape player system as claimed in claim 9 wherein said means for actuating said coupling means includes a pivotally mounted cam member having a plurality of cam surfaces, said cam member being coupled mechanically to said first and second actuator control members and being pivoted between a first and second position in response to the actuation of said control means, respectively, said auxiliary drive shaft normally engaging a first one of said cam surfaces when said cam member is in said first position, whereby said drive shaft is held out of engagement with said central hub shaft and upon pivoting said cam member to said second position, said drive shaft engaging another one of said cam surfaces to be moved thereby into driving engagement with said central hub shaft.

11. A cartridge tape player system as claimed in claim 7 where said cartridge tape player further includes a member mounted for pivotal movement between first and second positions, one portion of said member positioned for communication with said cartridge receiving cavity, means for coupling said member to said first and second actuator control members, said member being pivoted from said first to said second positions in response to the actuation of said first and second actuator control means, respectively, said one portion, upon movement of said member to said second position, engaging said tape cartridge to move the latter from said fully inserted position outwardly of said cavity to a predetermined location, thereby separating said capstan shaft and pressure roller and wherein said auxiliary drive means is positioned at a predetermined location for engagement with said hub means when said cartridge is moved to said predetermined location.

12. A cartridge tape player system as claimed in claim 9 wherein said tape cartridge further includes an expansion ring mounted therein, said expansion ring extending about the periphery of said wound tape and being movable between a normally contracted condition, whereby said ring limits the diameter of the tape wound about said hub means and an expanded condition, whereby said ring is spaced from the periphery of said tape and means coupled to said ring operable to move said ring from the contracted to the expanded condition upon insertion of said cartridge into said player in a fully inserted position for playback and for contracting said ring upon operation of said first and second actuator control means when said cartridge is moved to said predetermined location.

13. A cartridge tape player system as claimed in claim 12 wherein said cartridge tape player further includes means operable upon actuation of said second actuator control means for engaging said means in said cartridge operable to move said ring from said contracted to said expanded condition upon operation of said first and second actuator control means, to prevent operation of said last-mentioned means, thereby to maintain said ring in an expanded condition during the driving of said hub means by said auxiliary drive means in said first direction at a speed greater than said first predetermined speed.

14. A cartridge tape player system as claimed in claim 6 wherein said cartridge further includes a platen mounted in said cartridge coaxially with said hub means for independent rotation, said wound tape resting on said platen in said cartridge, and one-way clutch means operably engaging said platen and said hub means, said clutch means being engaged upon actuating said second actuator control means for joining said hub means and platen for rotation while driving said hub means rotatably in said first direction and being disengaged upon actuating said first actuator control means to permit independent rotation of said platen and hub means while driving said hub means in said reverse direction.

15. A cartridge tape player system including in combination: a tape cartridge comprising an outer housing; a tape hub mounted within said housing for rotation, a continuous loop recording tape wound about said hub, a pressure roller mounted for rotation in said housing at a predetermined location adjacent an opening in said housing, said tape extending from said hub through said cartridge along a path about said pressure roller and back to said hub, said pressure roller being accessible through said opening for engagement thereof for driving said tape along said path in a first direction at a first predetermined speed, said tape thereby being removed from said hub at the inner convolution and returned thereto at the outer convolution, and a cartridge tape player including a cartridge receiving cavity, tape playing and driving apparatus including a capstan shaft mounted on said player in communication with said cavity for engagement with said pressure roller in said cartridge upon insertion of the latter into said cavity for playback, drive motor means coupled to said capstan shaft for driving said shaft rotatably, whereby upon insertion of said cartridge into said player for playback said tape is driven through said cartridge in said first direction, auxiliary drive means mounted on said player at a predetermined location for driving said hub directly, said auxiliary drive means being coupled to said capstan shaft for rotation therewith, means for coupling said auxiliary drive means to said hub, said coupling means being operable to coupled and uncoupled conditions, and reverse and fast-forward actuator control means, both said control means being coupled to said coupling means for operating the latter from an uncoupled to a coupled condition for driving said hub in reverse and fast-forward modes of operation, respectively, and switch means coupled electrically to said drive motor means for reversing the direction of rotational drive of said auxiliary drive means, said switch means being operated by said fast-forward actuator control means for reversing the direction of rotation of said auxiliary drive means during fast-forward operation.

16. A cartridge tape player system as claimed in claim 15 wherein said tape cartridge further includes guide finger means mounted therein and including a portion extending between an inner convolution of said tape and said hub for separating the tape from the hub upon actuation of said reverse actuator control means.

17. A cartridge tape player system as claimed in claim 16 wherein said tape cartridge includes a central hub shaft mounted therein, said hub being coupled to said central shaft for rotation therewith, said central hub shaft being accessible from outside said cartridge for driving said hub rotatably, wherein said reverse and fast-forward actuator control means each include a control member movable between first, non-actuated and second, actuated positions, and wherein said auxiliary drive means includes a rotatable drive member movable into and out of driving engagement with the central hub shaft of said cartridge, said drive member being coupled to said reverse and fast-forward actuator control members for movement into engagement with said central hub shaft upon movement of either of said reverse and fast-forward actuator control members from said first to said second positions.

18. A cartridge tape player system as claimed in claim 16 wherein said tape cartridge further includes a guide ring mounted therein, said guide ring encircling said continuous loop tape wound about said hub and being movable between expanded and contracted positions, and means coupled to said guide ring for moving the latter to an expanded condition upon the insertion of a cartridge into said player for playback and to said contracted position upon actuation of said reverse actuator control means, said guide ring limiting the diameter of the tape wound about said hub in the reverse mode of operation.

19. A cartridge tape player system as claimed in claim 17 wherein said auxiliary rotatable drive member includes a drive shaft mounted adjacent said cartridge receiving cavity for movement into and out of engagement with the central hub shaft of a cartridge inserted into said cavity when said cartridge is at a predetermined location therein, and wherein said cartridge tape player further includes means mounted therein in communication with said cartridge receiving cavity, said last-mentioned means including a member mounted for movement into and out of engagement with a cartridge inserted into said player, means for coupling said member to said reverse and fast-forward actuator control members, said member being movable into engagement with said cartridge upon operation of either of said control members, said member upon engagement with said cartridge, urging the latter away from said capstan shaft to said predetermined location for aligning said central hub shaft with said auxiliary drive shaft.

20. A cartridge tape player system as claimed in claim 19 wherein said cartridge tape player further includes a cartridge latching means for removably latching said cartridge into said player cavity for playback with the pressure roller therein in engagement with said capstan shaft, said latching means including a resilient biasing member mounted for engagement with said cartridge for urging the latter into said cavity and wherein upon operation of one of said reverse and fast-forward control members to move said movable member into engagement with said cartridge, the latter is moved against said resilient biasing member of said latching means, said resilient biasing member returning said cartridge to said playback position upon release of said one of said control members.

21. A tape cartridge for use in a cartridge type tape player including a cartridge receiving cavity, tape playing and driving apparatus including a drive motor and a capstan drive shaft mounted in communication with said cavity and being coupled to said drive motor for rotation thereby, said capstan for driving a recording tape in a forward direction at a first speed through a cartridge inserted into said cavity during playback, auxiliary tape drive means mounted in said player for driving said recording tape through a cartridge inserted into said player in a reverse direction at a second speed and means for actuating said auxiliary tape drive means for operation thereof, said tape cartridge including in combination; an outer housing having a base member, the housing dimensioned for receipt in the cartridge receiving cavity of said player, a rotatable hub mounted in said housing for rotation about an axis substantially perpendicular to the base member, a continuous loop tape wound about said hub, a pressure roller mounted for rotation within said housing adjacent an opening in one wall thereof, said pressure roller being spaced from said hub and said tape extending from the latter along a predetermined path from said hub about said pressure roller and back to said hub, said pressure roller being accessible through the opening in said housing wall for engagement by the capstan drive shaft of said cartridge tape player upon insertion of said cartridge into said player cavity for driving said tape through said cartridge in said forward direction under tension at said first speed, said tape thereby being removed from said hub at the innermost convolution and returned thereto at the outermost convolution, means on the hub engaged by the auxiliary drive means for driving the hub in the reverse direction and tape guide means mounted within said housing for guiding said tape between the innermost convolution thereof and said hub upon driving said hub with said auxiliary drive means in said reverse direction, to remove said tape from the hub at the outermost convolution and to return the tape thereto at the innermost convolution under tension.

22. A tape cartridge as claimed in claim 21 wherein said guide means includes a first guide finger mounted at one end at a predetermined location within said cartridge housing, spaced from said wound tape and hub, the opposite end thereof extending toward said tape hub and including a portion extending between the innermost convolution of said tape and hub for separating the former from the latter thereby permitting tape being returned to said hub during the movement of said tape in said reverse direction, to be wound about said hub.

23. A tape cartridge for use in a cartridge type tape player including a cartridge receiving cavity, tape playing and driving apparatus including a drive motor and a capstan drive shaft mounted in communication with said cavity and being coupled to said drive motor for rotation thereby, said capstan for driving a recording tape in a first direction at a first speed through a cartridge inserted into said cavity during playback, auxiliary tape drive means mounted in said player for driving said recording tape through a cartridge inserted into said player in a direction opposite from said first direction at a second speed and means for actuating said auxiliary tape drive means for operation thereof, said tape cartridge including in combination; an outer housing dimensioned for receipt in the cartridge receiving cavity of said player, a rotatable hub mounted in said housing, a continuous loop tape wound about said hub, a pressure roller mounted for rotation within said housing adjacent an opening in one wall thereof, said pressure roller being spaced from said hub and said tape extending from the latter along a predetermined path from said hub about said pressure roller and back to said hub, said pressure roller being accessible through the opening in said housing wall for engagement by the capstan drive shaft of said cartridge tape player upon insertion of said cartridge into said player cavity for driving said tape through said cartridge in said first direction at said first speed, said tape thereby being removed from said hub at the innermost convolution and returned thereto at the outermost convolution, and tape guide means mounted within said housing and including a portion for guiding said tape between the innermost convolution thereof and said hub upon driving said hub with said auxiliary drive means in said opposite direction, said guide means including a first guide finger mounted at one end at a predetermined location within said cartridge housing, spaced from said wound tape and hub, the opposite end thereof extending toward said tape hub and including a portion extending between the innermost convolution of said tape and hub for separating the former from the latter, said portion of said first guide finger being substantially U-shaped with a first leg of the U extending between said innermost tape convolution and said hub and the base of the U overlying said wound tape and being spaced therefrom, said U-shaped portion being tapered in the direction of movement of the tape being returned to said hub for guiding the tape therethrough before winding about said hub, whereby said tape is removed from the hub at the outermost convolution and is permitted to be returned thereto at the innermost convolution to be wound about said hub during the movement of said tape in said opposite direction.

24. A tape cartridge as claimed in claim 23 further including second and third guide fingers each being mounted at a first end at a location in said cartridge different than that whereat the one end of said first guide finger is mounted, the opposite end of said second guide finger being curved for receipt in the U-shaped end of said first guide finger for guiding the tape being returned to said hub into the U and the opposite end of said third finger extending between said hub and the inner convolution of said tape upstream of said opposite end of said first guide finger during the driving of said tape in said opposite direction for preliminarily separating the inner convolution of said tape and said hub prior to returning the tape to said hub.

25. A tape cartridge for use in a cartridge type tape player including a cartridge receiving cavity, tape playing and driving apparatus including a drive motor and a capstan drive shaft mounted in communication with said cavity and being coupled to said drive motor for rotation thereby, said capstan for driving a recording tape in a first direction at a first speed through a cartridge inserted into said cavity during playback, auxiliary tape drive means mounted in said player for driving said recording tape through a cartridge inserted into said player in a direction opposite from said first direction at a second speed and means for actuating said auxiliary tape drive means for operation thereof, said tape cartridge including in combination; an outer housing dimensioned for receipt in the cartridge receiving cavity of said player, a rotatable hub mounted in said housing, a continuous loop tape wound about said hub, a pressure roller mounted for rotation within said housing adjacent an opening in one wall thereof, said pressure roller being spaced from said hub and said tape extending from the latter along a predetermined path from said hub about said pressure roller and back to said hub, said pressure roller being accessible through the opening in said housing wall for engagement by the capstan drive shaft of said cartridge tape player upon insertion of said cartridge into said player cavity for driving said tape through said cartridge in said first direction at said first speed, said tape thereby being removed from said hub at the innermost convolution and returned thereto at the outermost convolution, tape guide means mounted within said housing and including a portion for guiding said tape between the innermost convolution thereof and said hub upon driving said hub with said auxiliary drive means in said opposite direction, a guide ring mounted in said housing, said guide ring encircling said wound tape and being expandible and contractable, and means included in said housing coupled to said guide ring for expanding the latter upon insertion of said cartridge into said cartridge player cavity for playback and for contracting said ring about said wound tape for limiting the diameter thereof when said tape is driven through said cartridge by said auxiliary drive means in said opposite direction, whereby said tape is removed from the hub at the outermost convolution and returned thereto at the innermost convolution when it is driven in said opposite direction.

26. A tape cartridge as claimed in claim 25 wherein said guide ring expanding and contracting means includes a pin member normally extending from said housing and movable to an inserted position within said cartridge, said pin member being engagable with means in said cartridge player for movement of said pin into said housing to said inserted position upon insertion of said cartridge into said player cavity for playback, whereby said guide ring is expanded, and said pin member being movable outwardly of said cartridge to said extended position upon operation of said auxiliary drive actuating means to permit said guide ring to be contracted about said wound tape.

27. A tape cartridge for use in a cartridge type tape player including a cartridge receiving cavity, tape playing and driving apparatus including a drive motor and a capstan drive shaft mounted in communication with said cavity and being coupled to said drive motor for rotation thereby, said capstan for driving a recording tape in a forward direction at a first speed through a cartridge inserted into said cavity during playback, auxiliary tape drive means mounted in said player for driving said recording tape through a cartridge inserted into said player in a reverse direction at a second speed and means for actuating said auxiliary tape drive means for operation thereof, said tape cartridge including in combination; an outer housing having a base member, the housing dimensioned for receipt in the cartridge receiving cavity of said player, a rotatable hub mounted in said housing for rotation about an axis substantially perpendicular to the base member, a continuous loop tape wound about said hub, a pressure roller mounted for rotation within said housing adjacent an opening in one wall thereof, said pressure roller being spaced from said hub and said tape extending from the latter along a predetermined path from said hub about said pressure roller and back to said hub, said pressure roller being accessible through the opening in said housing wall for engagement by the capstan drive shaft of said cartridge tape player upon insertion of said cartridge into said player cavity for driving said tape through said cartridge in said forward direction under tension at said first speed, said tape thereby being removed from said hub at the innermost convolution and returned thereto at the outermost convolution, tape guide means mounted within said housing and including a portion for guiding said tape between the innermost convolution thereof and said hub upon driving said hub with said auxiliary drive means in said reverse direction to remove said tape from the hub at the outermost convolution and to return said tape thereto at the innermost convolution under tension, a platen mounted coaxially with said tape hub within said cartridge housing for independent rotation with respect to said hub, said wound tape resting on said platen within said housing, and one-way clutch means positioned between said tape hub and said platen, said clutch means being operable to join said hub and platen for joint rotation upon driving said tape in the forward direction and said clutch means being inoperable when said tape is driven in the reverse direction.

28. A cartridge tape player for playing information recorded on a continuously wound recording tape mounted on a rotatable hub within the housing of a tape cartridge received in said tape player, said cartridge also including a rotatably mounted pressure roller about which said tape passes, said tape extending from said hub at the innermost convolution thereof along a path about said pressure roller and back to said hub at the outermost convolution thereof, said tape player including in combination; a cavity for receiving tape cartridges to be played in said player, tape playing and driving instrumentalities including a capstan drive shaft mounted in communication with said cavity for engagement with the pressure roller upon insertion of a cartridge into said player cavity for driving said tape through said cartridge in a first direction at a first speed, whereby said tape is removed from said hub at the innermost convolution and returned thereto at the outermost convolution, and auxiliary tape drive means mounted for movement into and out of a coupled relation with respect to said tape hub for driving said tape hub in a direction opposite from said first direction and at a speed different than said first speed, and means coupled to said auxiliary drive means for moving the latter into said coupled relation with respect to the tape hub of a cartridge received in said cavity.

29. A cartridge tape player as claimed in claim 28 wherein said auxiliary tape drive means includes a drive shaft member mounted for movement into and out of engagement with said tape hub for driving said hub directly in said opposite direction, said auxiliary drive means being coupled to said capstan shaft for rotation in accordance therewith and wherein said auxiliary tape drive actuating means includes a first member operable between first and second positions, said member being coupled to said auxiliary drive shaft for movement of the latter into and out of engagement with said tape hub in response to the movement of said actuating member between said first and second positions, respectively.

30. A cartridge tape player as claimed in claim 29 wherein said auxiliary drive means further includes a movable member coupled to said first auxiliary drive actuating member, said movable member being mounted in communication with said cartridge receiving cavity and being movable into and out of engagement with a cartridge inserted into said cavity, for urging said cartridge away from said capstan drive shaft during the driving of said tape hub by said auxiliary drive shaft, said movable member being moved into engagement with said cartridge upon movement of said actuating member from said first to said second position and being removed from engagement with said cartridge upon movement of said actuating member from said second to said first position.

31. A cartridge tape player as claimed in claim 29 wherein said auxiliary drive means further includes a second member coupled to said, auxiliary drive shaft for actuating the latter for movement into and out of engagement with said hub and means for reversing the direction of rotation of said drive shaft, said reversing means being positioned for engagement by said second member upon operation thereof from said first to said second position, whereby said auxiliary drive shaft is driven in said first direction.

32. The tape cartridge as claimed in claim 27 wherein the hub has a central portion around its central axis and the one-way clutch comprises at least one staple-like wire member extending through the hub obliquely to the axis of rotation from a point in the central portion of the hub to a point engagable with the underlying platen.

33. A tape cartridge for use in a cartridge type tape player including a cartridge receiving cavity, tape playing and driving apparatus including a drive motor and a capstan drive shaft mounted in communication with said cavity and being coupled to said drive motor for rotation thereby, said capstan for driving a recording tape in a forward direction at a first speed through a cartridge inserted into said cavity during playback, auxiliary tape drive means mounted in said player for driving said recording tape through a cartridge inserted into said player in a reverse direction at a second speed and means for actuating said auxiliary tape drive means for operation thereof, said tape cartridge including in combination; an outer housing having a base member, the housing dimensioned for receipt in the cartridge receiving cavity of said player, a rotatable hub mounted in said housing for rotation about an axis substantially perpendicular to the base member, a continuous loop tape wound about said hub, a pressure roller mounted for rotation within said housing adjacent an opening in one wall thereof, said pressure roller being spaced from said hub and said tape extending from the latter along a predetermined path from said hub about said pressure roller and back to said hub, said pressure roller being accessible through the opening in said housing wall for engagement by the capstan drive shaft of said cartridge tape player upon insertion of said cartridge into said player cavity for driving said tape through said cartridge in said forward direction under tension at said first speed, said tape thereby being removed from said hub at the innermost convolution, and returned thereto at the outermost convolution, tape guide means mounted within said housing and including a portion for guiding said tape between the innermost convolution thereof and said hub upon driving said hub with said auxiliary drive means in said reverse direction to remove said tape from the hub at the outermost convolution and to return said tape thereto at the innermost convolution under tension, the cartridge housing having a base wall and an aperture therein, and means coupled to the hub through the aperture in the base wall and adapted to be directly driven by the auxiliary drive means for driving the hub in the reverse direction.

34. The tape cartridge of claim 33 wherein the hub has a central portion surrounding its axis of rotation and the said means coupled to the hub includes a shaft extending through the hub along its axis of rotation one end of which is slotted to receive a cooperable drive end of the auxiliary tape drive means and the other end of which is secured to the central portion of the hub.

35. A cartridge tape player system including in combination; a tape cartridge comprising an outer housing, rotatable hub means mounted with said housing, a continuous loop tape wound about said hub means, a pressure roller mounted for rotation in said cartridge at a predetermined location adjacent an opening in one wall of said housing, said pressure roller being spaced from said continuous loop tape wound about said hub means and said tape extending along a predetermined path from said hub means about said pressure roller and back to said hub means, said pressure roller being accessible through said opening for engagement thereof for driving said tape through said cartridge in a forward direction at a first predetermined speed and for rotating said hub means in a corresponding forward direction, and a cartridge tape player including a cartridge receiving cavity, tape playing and driving instrumentalities including a capstan drive shaft mounted on said player in communication with said cavity for engagement with the pressure roller in said cartridge upon insertion of the latter fully into said cavity, said tape being driven by said capstan shaft in said forward direction through said cartridge and being removed from said hub means at the inner convolution and returned thereto at the outer convolution during a normal playback mode of operation of said player and an auxiliary drive assembly for transporting said tape through said cartridge in the forward direction at a second predetermined speed substantially higher than said first speed including auxiliary drive means, means for coupling said auxiliary drive means to said hub means for directly driving said hub means in the forward direction and means for actuating said coupling means, whereby said tape is transported through said cartridge in said forward direction by being removed from said hub means at the inner convolution and returned to said hub means at the outer convolution at a speed substantially higher than the speed at which the tape is driven by said capstan drive shaft.

36. A tape cartridge for use in a cartridge type tape player including a cartridge receiving cavity, tape playing and driving apparatus including a drive motor and a capstan drive shaft mounted in communication with said cavity and being coupled to said drive motor for rotation thereby, said capstan for driving a recording tape in a forward direction at a first predetermined speed through a cartridge inserted into said cavity during playback, auxiliary drive means mounted in said player for transporting said recording tape through a cartridge inserted into said player in the forward direction at second predetermined substantially higher speed and means for actuating said auxiliary drive means for operation thereof, said tape cartridge including in combination; an outer housing dimensioned for receipt in the cartridge receiving cavity of said player, a rotatable hub mounted in said housing, a continuous loop tape wound about said hub, a pressure roller mounted for rotation within said housing adjacent an opening in one wall thereof, said pressure roller being spaced from said hub and said tape extending from the latter along a predetermined path from said hub about said pressure roller and back to said hub, said pressure roller being accessible through the opening in said housing wall for engagement by the capstan drive shaft of said cartridge tape player upon insertion of said cartridge into said player cavity for driving said tape through said cartridge in said forward direction at said first speed, said tape thereby being removed from said hub at the innermost convolution and returned thereto at the outermost convolution and means on the hub engageable with the auxiliary drive means for directly driving the hub in the forward direction, whereby said tape is transported through said cartridge in said forward direction by being removed from the hub at the innermost convolution and returned thereto at the outermost convolution at a speed substantially higher than the speed at which the tape is driven by said capstan drive shaft.

37. A cartridge tape player for playing information recorded on a continuously wound recording tape mounted on a rotatable hub within the housing of a tape cartridge received in said tape player, said cartridge also including a rotatably mounted pressure roller about which said tape passes, said tape extending from said hub at the innermost convolution thereof along a path about said pressure roller and back to said hub at the outermost convolution thereof, said tape player including in combination; a cavity for receiving tape cartridges to be played in said player, tape playing and driving instrumentalities including a capstan drive shaft mounted in communication with said cavity for engagement with the pressure roller upon insertion of a cartridge into said player cavity for driving said tape through said cartridge in a forward direction at a first speed, whereby said tape is removed from said hub at the innermost convolution and returned thereto at the outermost convolution, and auxiliary hub drive means mounted for movement into and out of a coupled relation with respect to said tape hub for driving said tape hub in said forward direction at a second speed substantially higher than said first speed, and means coupled to said auxiliary drive means for moving the latter into said coupled relation with respect to the tape hub of a cartridge received in said cavity.

* * * * *

UNITED STATES PATENT AND TRADEMARK OFFICE

CERTIFICATE OF CORRECTION

PATENT NO. : 3,894,699

DATED : July 15, 1975

INVENTOR(S) : Edwin S. Bara

It is certified that error appears in the above-identified patent and that said Letters Patent are hereby corrected as shown below:

In the Abstract, line 1, change "sytem" to --system--.

Column 1, line 12, change "the" to --one--.

Column 1, line 64, change "ahd" to --and--.

Column 2, line 29, after "roll" insert --rests--.

Column 4, line 5, change "on" to --of--.

Column 4, line 46, after "extension" insert --piece--.

Column 6, line 6, change "36" to --136--.

Column 6, line 11, change "depression of" to --in a--.

Column 6, line 22, change "oof" to --of--.

Column 7, line 22, change "288" to --228--.

Column 7, line 45, change "bles" to --ples--.

Column 8, line 2, change "opening" to --openings--.

Column 12, line 2, change "FIg" to --FIG--.

Column 12, line 48, change "construction" to --constriction--.

Column 18, line 65, change "reverse" to --opposite--.

Column 24, line 14, after "at" insert --a--.

Signed and Sealed this

*ninth* Day of *December 1975*

[SEAL]

*Attest:*

RUTH C. MASON
*Attesting Officer*

C. MARSHALL DANN
*Commissioner of Patents and Trademarks*